(12) United States Patent
Terada et al.

(10) Patent No.: US 7,201,685 B2
(45) Date of Patent: Apr. 10, 2007

(54) PULLEY UNIT

(75) Inventors: Tadahiro Terada, Nara (JP); Michiru Ueda, Nara (JP); Yoshitaka Nakagawa, Osaka (JP); Hideki Fujiwara, Nara (JP); Takahiro Ichihara, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/191,870

(22) Filed: Jul. 9, 2002

(65) Prior Publication Data
US 2003/0006113 A1    Jan. 9, 2003

(30) Foreign Application Priority Data
Jul. 9, 2001 (JP) ............................ P2001-207866

(51) Int. Cl.
*F16H 9/00* (2006.01)
*F16C 33/76* (2006.01)
*F16C 33/86* (2006.01)

(52) U.S. Cl. ........................ 474/70; 384/486

(58) Field of Classification Search ................ 384/486, 384/484, 485, 477, 448, 482; 474/199, 70
See application file for complete search history.

(56) References Cited

U.S. PATENT DOCUMENTS

| 5,042,822 | A | * | 8/1991 | Dreschmann et al. | 384/486 |
| 5,133,609 | A | * | 7/1992 | Ishiguro | 384/486 |
| 5,860,748 | A | * | 1/1999 | Okumura et al. | 384/486 |
| 6,042,272 | A | * | 3/2000 | Nagase | 384/486 |
| 6,065,879 | A | * | 5/2000 | Mitsue et al. | 384/486 |

* cited by examiner

*Primary Examiner*—Marcus Charles
(74) *Attorney, Agent, or Firm*—Jordan and Hamburg LLP

(57) ABSTRACT

The present invention comprises a pulley, a shaft body which is rotatable relative to the pulley and is concentrically disposed radially inside of the pulley, a one-way clutch which is interposed at an annular space between the pulley and the shaft body, a rolling bearing which is disposed in the annular space adjacent to the one-way clutch in an axial direction, an inner annular seal which is provided outside the rolling bearing in the annular space, and an outer annular seal which is provided outside the inner annular seal and has a proximal end portion and a distal end side lip. The proximal end portion of the outer annular seal is fixed to one of an inner peripheral surface of the pulley and an outer peripheral surface of the shaft body, and the distal end side lip of the outer annular seal contacts the other peripheral surface.

4 Claims, 11 Drawing Sheets

F I G. 2
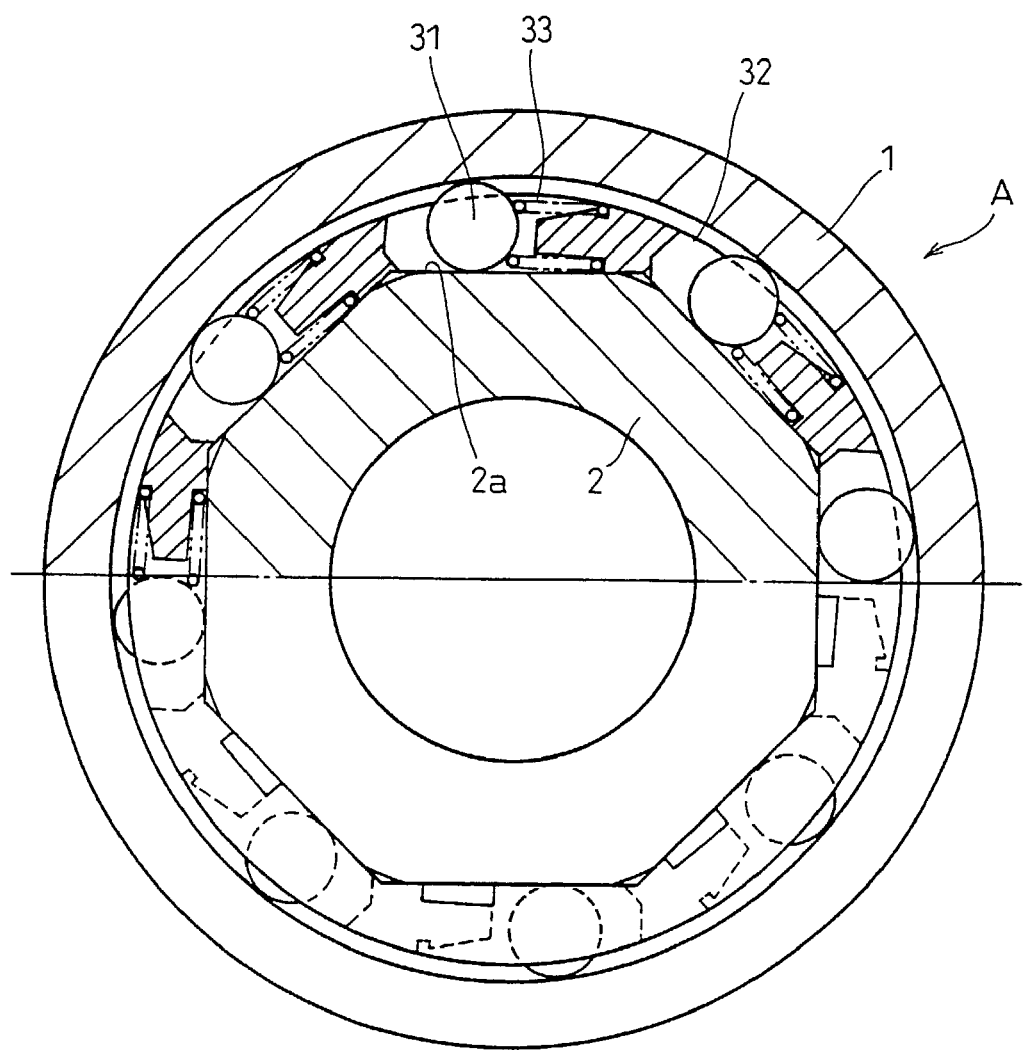

F I G. 10
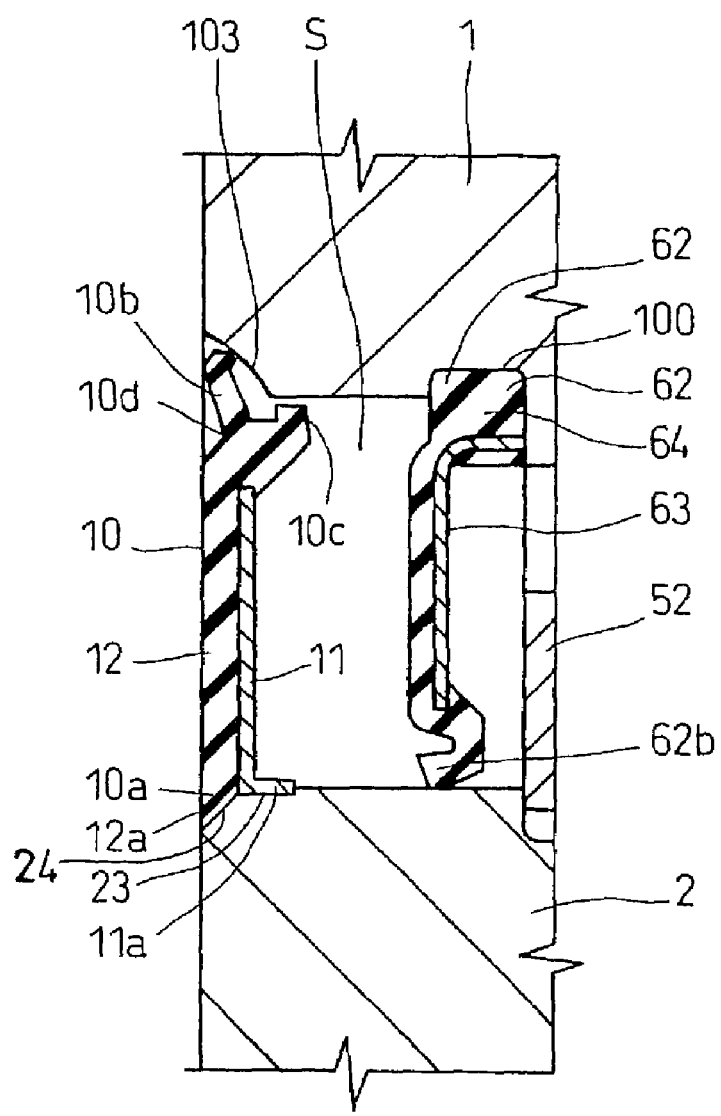

PULLEY UNIT

BACKGROUND OF THE INVENTION

1. Field of the Invention

The present invention relates to a pulley unit provided at auxiliary machines driven via a belt by a crank shaft of engine for automobile, including a compressor for air conditioner, a water pump, an alternator, and a cooling fan.

2. Description of the Related Art

Various types of auxiliary machines provided at an automobile engine are driven via a belt by a crank shaft of the engine. For example, assuming that an alternator is coupled so as to rotate synchronously with a crank shaft of an engine, if the rotational speed of the crank shaft is decreased, a power generating efficiency of the alternator is also decreased. Then, a pulley unit has been devised that a one-way clutch is built in a pulley portion of the alternator, when the rotational speed of the crank shaft is decreased, rotation of a rotor of the alternator is continued by its inertial force, so that the power generating efficiency can be improved.

A pulley unit A will be explained with reference to FIG. 11. A reference numeral 1 indicates a pulley. A reference numeral 2 indicates a shaft body which is concentrically disposed so as to be rotatable relative to the pulley 1. A reference numeral 3 indicates a one-way clutch which is interposed at an annular space S between the pulley 1 and the shaft body 2. Reference numerals 4 and 5 respectively indicate a deep groove ball bearing and a roller bearing that are disposed at axial direction sides of the one-way clutch 3 in the annular space S. A belt B is entrained about an outer periphery of the pulley 1, and the pulley 1 is rotationally driven by the crank shaft of the automobile engine. The shaft body 2 is fixed to the rotor of the alternator.

The one-way clutch 3 includes a plurality of rollers 31 accommodated within a cage 32. Each roller 31 is pressed by a coil spring 33 toward a wedge-shaped narrow side (i.e., a lock side) between a cam face 2a and an inner peripheral surface of the pulley 1. Deep groove bearing rings 43 and 44 are respectively formed at an inner surface of the pulley 1 and an outer surface of the shaft body 2. The deep groove ball bearing 4 includes a plurality of balls 41 and a cage 42.

The roller bearing 5 includes a plurality of rollers 51 and a cage 52. Bearing rings are directly formed at the inner surface of the pulley 1 and the outer surface of the shaft body 2. Annular seals 61 and 62 are provided so as to seal the annular space S in order to prevent leakage of lubricant. A metallic annular shield plate 7 is provided outside the annular seal 62 placed at the free end side in order to prevent muddy water from entering within the annular space S.

An operation of the pulley unit A will be described. When a rotational speed of the pulley 1 is relatively higher than that of the shaft body 2, the rollers 31 of the one-way clutch 3 roll toward the narrow side of the wedge-shaped space. Thus, the pulley unit A is moved in a locked state in which the pulley 1 is integrated with the shaft body 2 via the rollers 31 and they are rotated synchronously. When the rotational speed of the pulley 1 is relatively lower than that of the shaft body 2, the rollers 31 of the one-way clutch 3 roll toward a wide side of the wedge-shaped space. Thus, the pulley unit A is moved in a free state in which transmission of rotational power from the pulley 1 to the shaft body 2 is interrupted, and the shaft body 2 continues to rotate only by its rotational inertial force.

In accordance with such pulley unit A, under hard circumstances that water enters easily when an automobile is washed at high speed by a car washer installed at a gas station or that foreign matters such as muddy water or small stones enter easily while the automobile is traveling, it is difficult to prevent entering of such foreign matters only by the annular shield plate 7.

SUMMARY OF THE INVENTION

Accordingly, a main object of the present invention is to provide a pulley unit which can prevent securely entering of foreign matters even under hard circumstances that the foreign matters easily enter.

Other objects, characteristics and advantages of the present invention will be apparent from the following description.

The present invention can be summarized as follows.

A pulley unit of the present invention comprises a pulley, a shaft body which is rotatable relative to the pulley and is concentrically disposed radially inside of the pulley, a one-way clutch which is interposed at an annular space between the pulley and the shaft body, a rolling bearing which is provided in the annular space adjacent to the one-way clutch in an axial direction, an inner annular seal which is provided outside the rolling bearing in the annular space, and an outer annular seal which is provided outside the inner annular seal and has a proximal end portion and a distal end side lip. The proximal end portion of the outer annular seal is fixed to one of an inner peripheral surface of the pulley and an outer peripheral surface of the shaft body, and the distal end side lip contacts the other peripheral surface.

In accordance with the present invention, the distal end side lip of the outer annular seal preferably includes an axial lip.

In accordance with the present invention, a peripheral groove is preferably formed at the other peripheral surface, and the axial lip of the outer annular seal slide-contacts a radially inner peripheral surface of the peripheral groove.

In accordance with the present invention, the distal end side lip of the outer annular seal includes a radial lip.

BRIEF DESCRIPTION OF THE DRAWINGS

These and other objects as well as advantages of the invention will become clear by the following description of preferred embodiments of the invention with reference to the accompanying drawings, wherein:

FIG. 2 is a cross-sectional view of FIG. 1 along a line II—II;

FIG. 10 is an enlarged view of seal portion on the free end side of pulley unit relating to a seventh preferred embodiment of the present invention.

In all these figures, like components are indicated by the same numerals.

DETAILED DESCRIPTION OF PREFERRED EMBODIMENTS

First Preferred Embodiment

Figure 1:
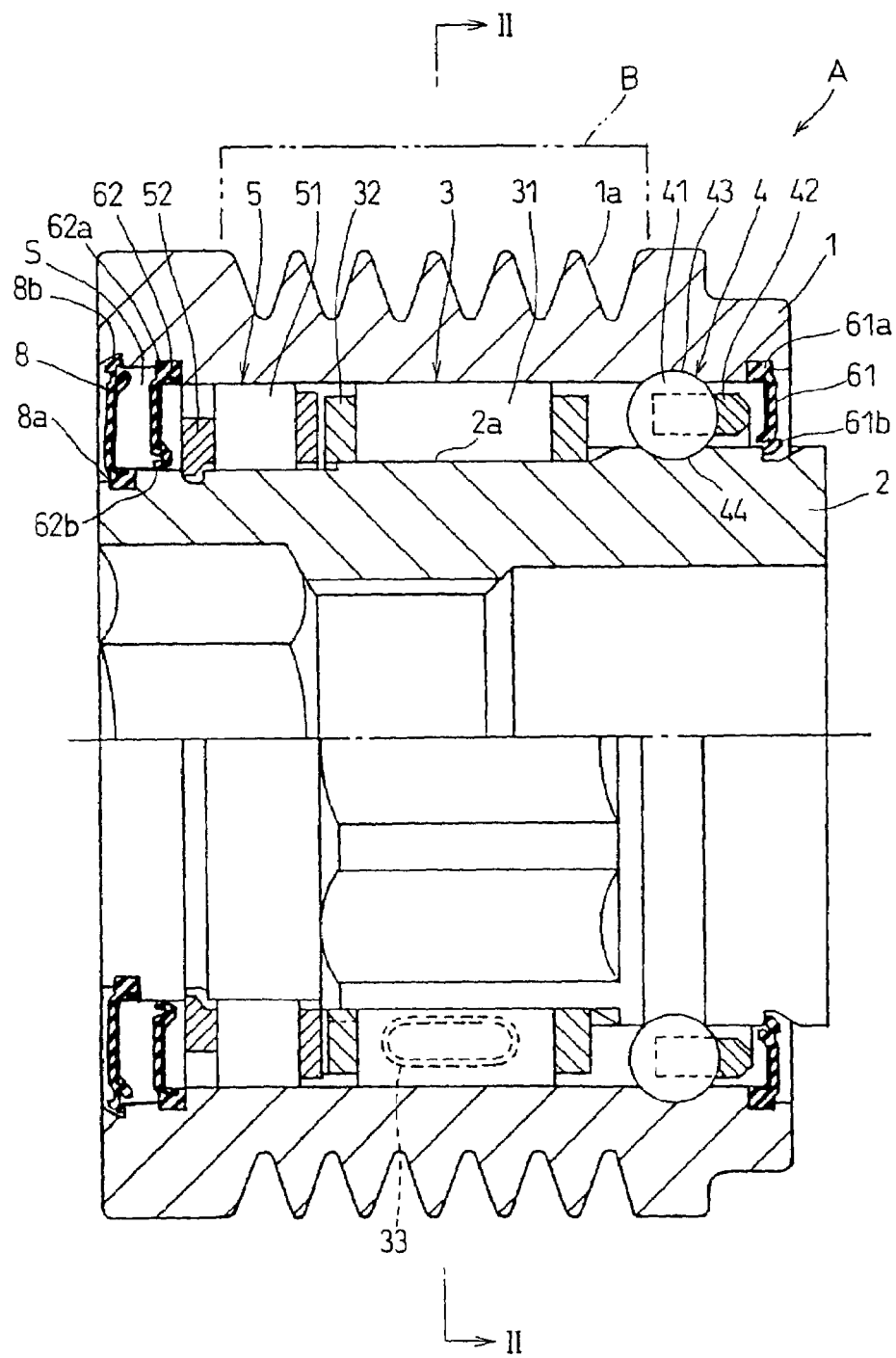
FIG. 1 is a cross-sectional view of pulley unit relating to a first preferred embodiment of the present invention.
Figure 3:
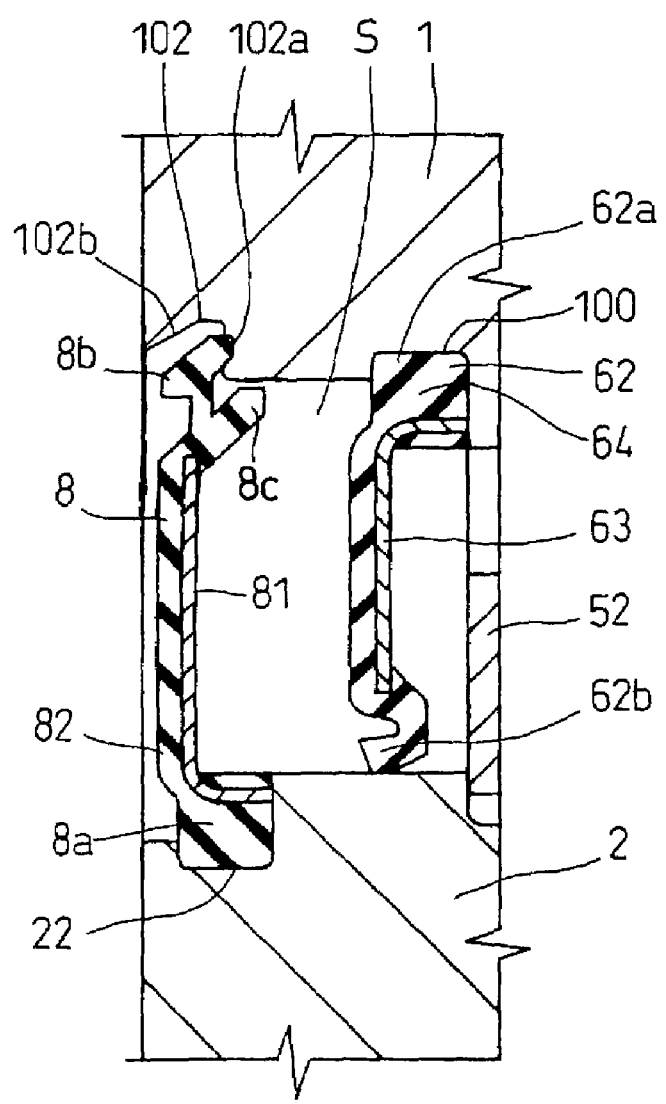
FIG. 3 is an enlarged view of seal portion on the free end side of the pulley unit shown in FIG. 1.

A pulley unit relating to a first preferred embodiment of the present invention will be described with reference to FIGS. 1 through 3. A pulley unit A includes a pulley 1, a shaft body 2 which is radially concentrically disposed so as to be rotatable relative to the pulley 1, a one-way clutch 3 which is interposed at an annular space S formed between the pulley 1 and the shaft body 2, and a deep groove ball bearing 4 and a roller bearing 5 disposed at axial direction sides of the one-way clutch 3 in the annular space S. The deep groove ball bearing 4 is placed at the side of accessory such as an alternator or the like. The deep groove ball bearing 4 includes a plurality of balls 41 and a cage 42. The cage 42 is formed in a crown shape having a plurality of pockets for accommodating the ball 41. Bearing rings 43 and 44 for the deep groove ball bearing 4 are directly formed at an inner peripheral surface of the pulley 1 and an outer peripheral surface of the shaft body 2. The roller bearing 5 is disposed at the free end side. The roller bearing 5 includes a plurality of rollers 51 and a cage 52. Bearing rings for the roller bearing 5 are directly formed at the inner peripheral surface of the pulley 1 and the outer peripheral surface of the shaft body 2. A belt guide surface 1a about which a belt B is entrained is formed at the outer peripheral surface of the pulley 1. The pulley 1 is rotatably driven by a crank shaft of automobile engine. The shaft body 2 is fixed to a rotor of alternator serving as an input shaft of accessory.

The one-way clutch 3 includes a plurality of rollers 31 accommodated within the cage 32. Each of the rollers 31 is pressed by a coil spring 33 toward a wedge-shaped narrow side (i.e., a lock side) formed between a cam face 2a formed at the outer peripheral surface of the shaft body 2 and the inner peripheral surface of the pulley 1. Inner annular seals 61 and 62 for preventing leakage of lubricant are respectively provided outsides of the deep groove ball bearing 4 and the roller bearing 5 so as to seal the annular space S. An outer annular seal 8 is provided outside the inner annular seal 62 placed at the free end side in order to prevent muddy water or the like from entering within the annular space S.

The free end side inner annular seal 62 provided is configured such that an outer periphery of annular core metal 63 is covered by an elastic body 64 such as a rubber or the like. The inner annular seal 62 has a proximal end portion 62a and a radial lip 62b on the distal end side. The proximal end portion 62a of the inner annular seal 62 is fitted into a peripheral groove 100 formed at the inner peripheral surface of the pulley 1. The radial lip 62b is elastically bent so as to abut the outer peripheral surface of the shaft body 2. Thus, the annular space S is sealed. The outer annular seal 8 is configured such that an outer periphery of an annular core metal 81 is covered by an elastic body 82 such as a rubber or the like. The outer annular seal 8 has a proximal end portion 8a, an axial lip 8b and an auxiliary lip 8c on the distal end side. The proximal end portion 8a of the outer annular seal 8 is fitted into a peripheral groove 22 formed at the outer peripheral surface of the shaft body 2. The axial lip 8b engages with a peripheral groove 102 formed at the inner peripheral surface of the pulley 1, and the annular space S is sealed thereby. In other words, the axial lip 8b and the auxiliary lip 8c protrude from the annular core metal 81 toward a bearing internal direction at an incline. The axial lip 8b is guided along a tapered surface 102b of the peripheral groove 102 toward the peripheral groove 102, and elastically slide-contacts a radially inner peripheral surface 102a of the peripheral groove 102. The auxiliary lip 8c is disposed so as to oppose the inner peripheral surface of the pulley 1 with a small distance therebetween.

Similar to the outer annular seal 8, the inner annular seal 61 has a proximal end portion 61a and an axial lip 61b on the distal end side. The proximal end portion 61a of the inner annular seal 61 is fitted into the peripheral groove formed at the inner peripheral surface of the pulley 1. Then, the axial lip 61b slide-contacts the peripheral groove formed at the outer peripheral surface of the shaft body 2. As a result, the annular space S is sealed.

An operation of the pulley unit A will be described.

If a rotational speed of the pulley 1 is relatively higher than that of the shaft body 2, the rollers 31 of the one-way clutch 3 roll toward the narrow wedge-shaped space. Thus, the pulley 1 is integrated with the shaft body 2 and they rotate synchronously (i.e., a locked state). If the rotational speed of the pulley 1 is relatively lower than that of the shaft body 2, the rollers 31 of the one-way clutch 3 roll toward the wide wedge-shaped space. Transmission of rotational power from the pulley 1 to the shaft body 2 is interrupted thereby, and the shaft body 2 continues to rotate only by its rotational inertial force (i.e., free state).

In a case of the above-described pulley unit A, as the annular space S on the free end side is sealed by the inner annular seal 62 and the outer annular seal 8 that are formed of contact type seals, it is possible to effectively prevent foreign matters such as muddy water or the like from entering the annular space S.

The axial lip 8b of the outer annular seal 8 which protrudes toward the bearing internal direction at an incline slide-contacts the radially inner peripheral surface 102a of the peripheral groove 102. Thus, if the muddy water enters, the axial lip 8b press-contacts the radially inner peripheral surface 102a because of pressure of the muddy water. As a result, entering of foreign matters such as muddy water or the like can be reliably prevented. Consequently, entering of foreign matters such as muddy water can be reliably prevented even under hard circumstances such as high speed car washing. The outer annular seal 8 seals the annular space S by the axial lip 8b slide-contacting the radially inner peripheral surface 102a, has a small torque and is suitable for the pulley unit A rotating at high speed.

In addition to the axial lip 8b, by providing the auxiliary lip 8c disposed so as to oppose the opposing surface with a small distance therebetween, an entering path for the foreign matters becomes complicated. Further, entering of the foreign matters such as muddy water or the like can be even further prevented by a labyrinth function of the auxiliary lip 8c.

The outer annular seal 8 can be made by molding a resin. Further, the outer annular seal 8 can be made inexpensively as compared to a conventional annular shield plate made by polishing a metallic plate. Even if muddy water enters within the outer annular seal 8, the muddy water is moved toward the radially outerside by a centrifugal force at a time of rotational operation, and drained outside from a space between the axial lip 8b and the peripheral groove 102. In accordance with the pulley unit A, differential rotation occurs only when rotational variation occurs at the pulley 1. Thus, a slide speed of the outer annular seal 8 is small, and even if the axial lip 8b slide-contacts the pulley 1 on the outer diameter side, problems about durability of the outer annular seal 8 do not occur.

Second Preferred Embodiment

Figure 4:
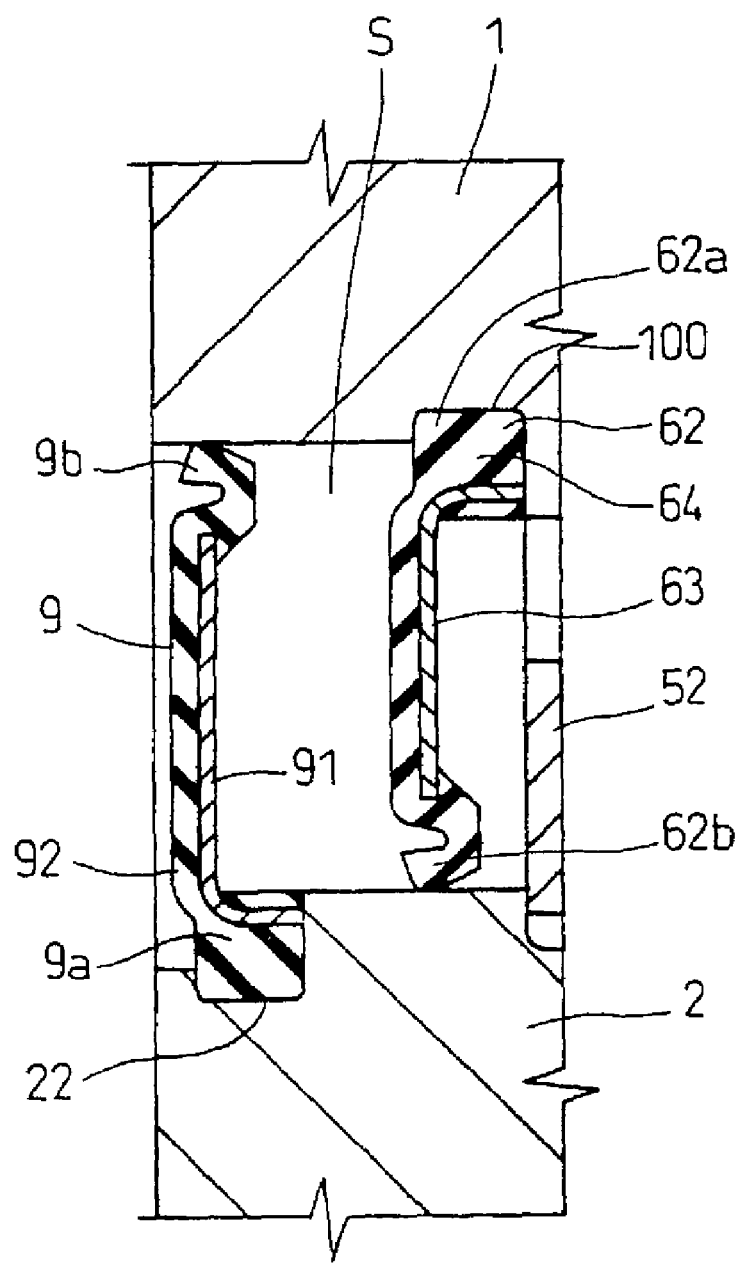
FIG. 4 is an enlarged view of seal portion on the free end side of pulley unit relating to a second preferred embodiment of the present invention.

A pulley unit relating to a second preferred embodiment of the present invention will be described with reference to FIG. 4. The whole structure of the pulley unit A relating to the second embodiment is the same as that of FIGS. 1 and 2. In the second embodiment, an outer annular seal 9 is provided instead of the outer annular seal 8 of the first embodiment.

The outer annular seal 9 is configured such that an outer periphery of an annular core metal 91 is covered by an elastic body 92 such as a rubber. The outer annular seal 9 has a proximal end portion 9a and a radial lip 9b on the distal end side. The proximal end portion 9a of the outer annular seal 9 is fitted into a peripheral groove 22 formed at the outer peripheral surface of the shaft body 2. The radial lip 9b is elastically bent to abut the inner peripheral surface of the pulley 1, so that the annular space S is sealed.

In a case of the pulley unit A relating to the second embodiment, the annular space S on the free end side is sealed by a double contact type seal formed of the inner annular seal 62 and the outer annular seal 9. Thus, entering of foreign matters such as muddy water or the like can be reliably prevented even under hard circumstances such as high speed car washing. The outer annular seal 9 can be made inexpensively. Even if muddy water enters within the outer annular seal 9, the muddy water is moved toward the radially outerside by a centrifugal force at a time of rotational operation, and drained outside from a space between the radial lip 9b and the inner peripheral surface of the pulley 1.

Third Preferred Embodiment

Figure 5:
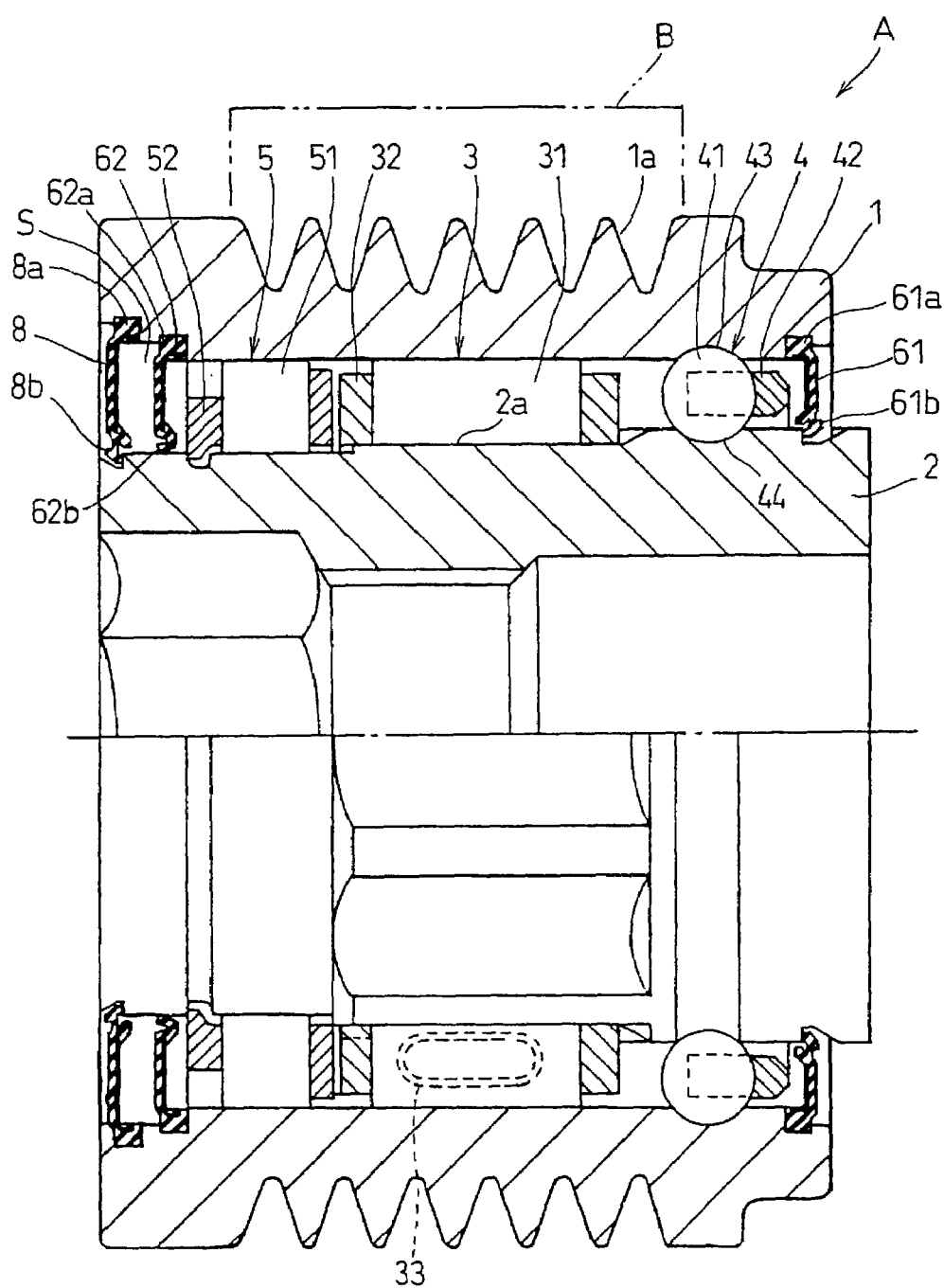
FIG. 5 is a cross-sectional view of pulley unit relating to a third preferred embodiment of the present invention.
Figure 6:
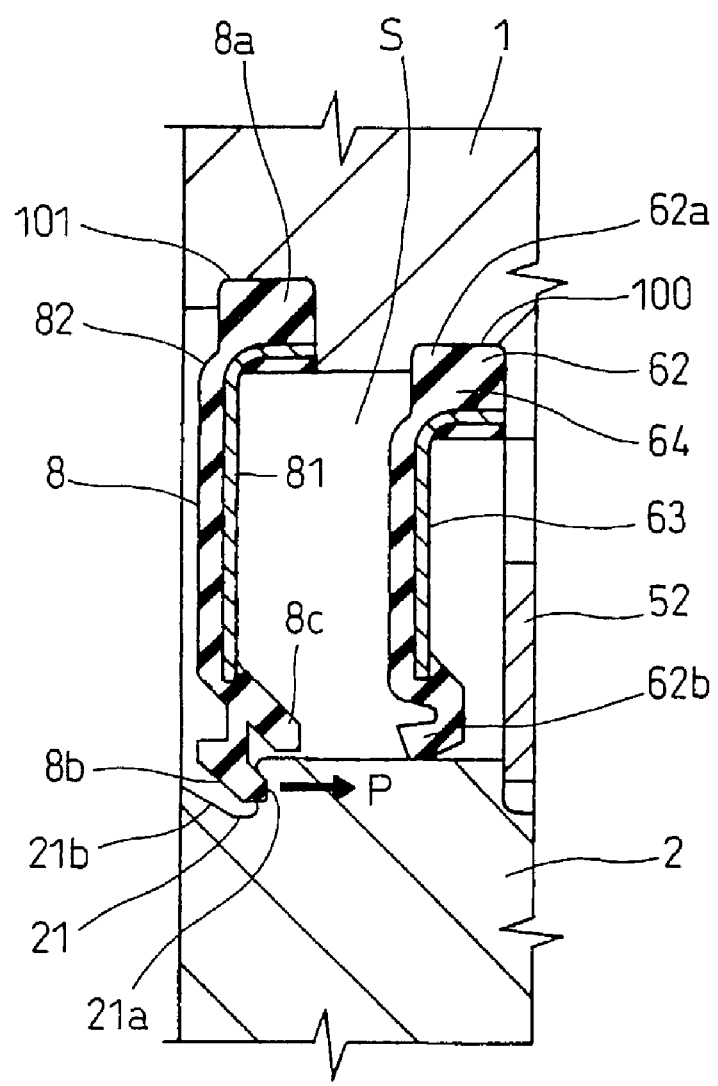
FIG. 6 is an enlarged view of seal portion on the free end side of the pulley unit shown in FIG. 5.

A pulley unit relating to a third preferred embodiment of the present invention will be described with reference to FIGS. 5 and 6. In accordance with the third embodiment, the outer annular seal 8 of the first embodiment is mounted upside down in a radial direction. Namely, the proximal end portion 8a of the outer annular seal 8 is fitted into the peripheral groove 101 formed at the inner peripheral surface of the pulley 1. The axial lip 8b engages with the peripheral groove 21 formed at the outer peripheral surface of the shaft body 2. In this way, the annular space S is sealed. The axial lip 8b is guided within the peripheral groove 21 along a tapered surface 21b of the peripheral groove 21, and elastically slide-contacts a radially inner peripheral surface 21a of the peripheral groove 21. The auxiliary lip 8c is disposed so as to oppose the outer peripheral surface of the shaft body 2 with a small distance therebetween.

In accordance with the pulley unit A of the third embodiment, as in the first embodiment, the annular space S on the free end side is sealed by a double contact type seal formed of the inner annular seal 62 and the outer annular seal 8. Consequently, even under hard circumstances such as high speed car washing, entering of foreign matters such as muddy water can be reliably prevented. The outer annular seal 8 can be made inexpensively. The outer annular seal 8 has a small torque and is suitable for high speed rotating pulley unit A. In addition to the axial lip 8b, by providing the auxiliary lip 8c disposed so as to oppose the opposing surface with a small distance therebetween, an entering path for the foreign matters becomes complicated. Further, entering of the foreign matters such as muddy water can be even further prevented by a labyrinth function of the auxiliary lip 8c. When the pulley unit A is rotated at high speed, the axial lip 8b protruding in a bearing internal direction at an incline deflects by a centrifugal force in a direction for press-contacting the radially inner peripheral surface 21a (i.e., direction indicated by the arrow P), so that entering of muddy water can be prevented.

Fourth Preferred Embodiment

Figure 7:
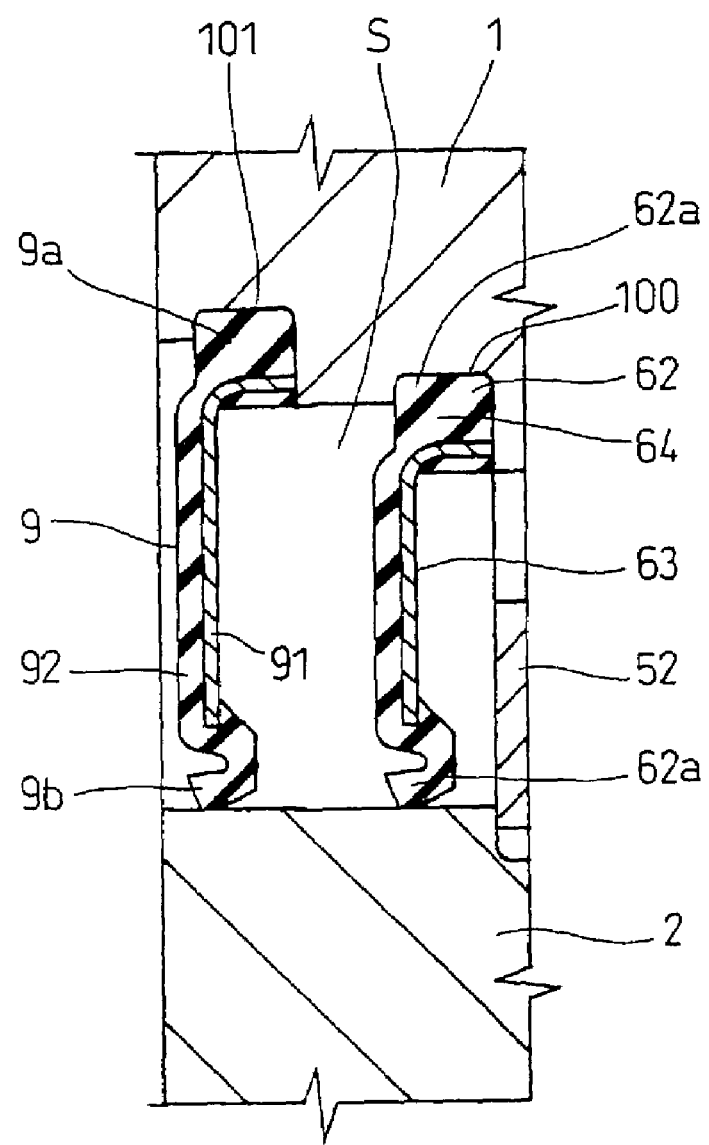
FIG. 7 is an enlarged view of seal portion on the free end side of pulley unit relating to a fourth preferred embodiment of the present invention.

A pulley unit relating to a fourth preferred embodiment of the present invention will be described with reference to FIG. 7. The whole structure of the pulley unit A of the fourth embodiment has the same as in the first embodiment. In accordance with the fourth embodiment, the outer annular seal 9 of the second embodiment is mounted upside down in a radial direction. The proximal end portion 9a of the outer annular seal 9 is fitted into the peripheral groove 101 formed at the inner peripheral surface of the pulley 1. The radial lip 9b is elastically bent to abut the outer peripheral surface of the shaft body 2. In this way, the annular space S is sealed.

In accordance with such pulley unit A, the annular space S on the free end side is sealed by a double contact type seal formed of the inner annular seal 62 and the outer annular seal 9. Thus, entering of foreign matters such as muddy water can be reliably prevented even under hard circumstances such as high speed car washing. The outer annular seal 9 can be made inexpensively.

Fifth Preferred Embodiment

Figure 8:
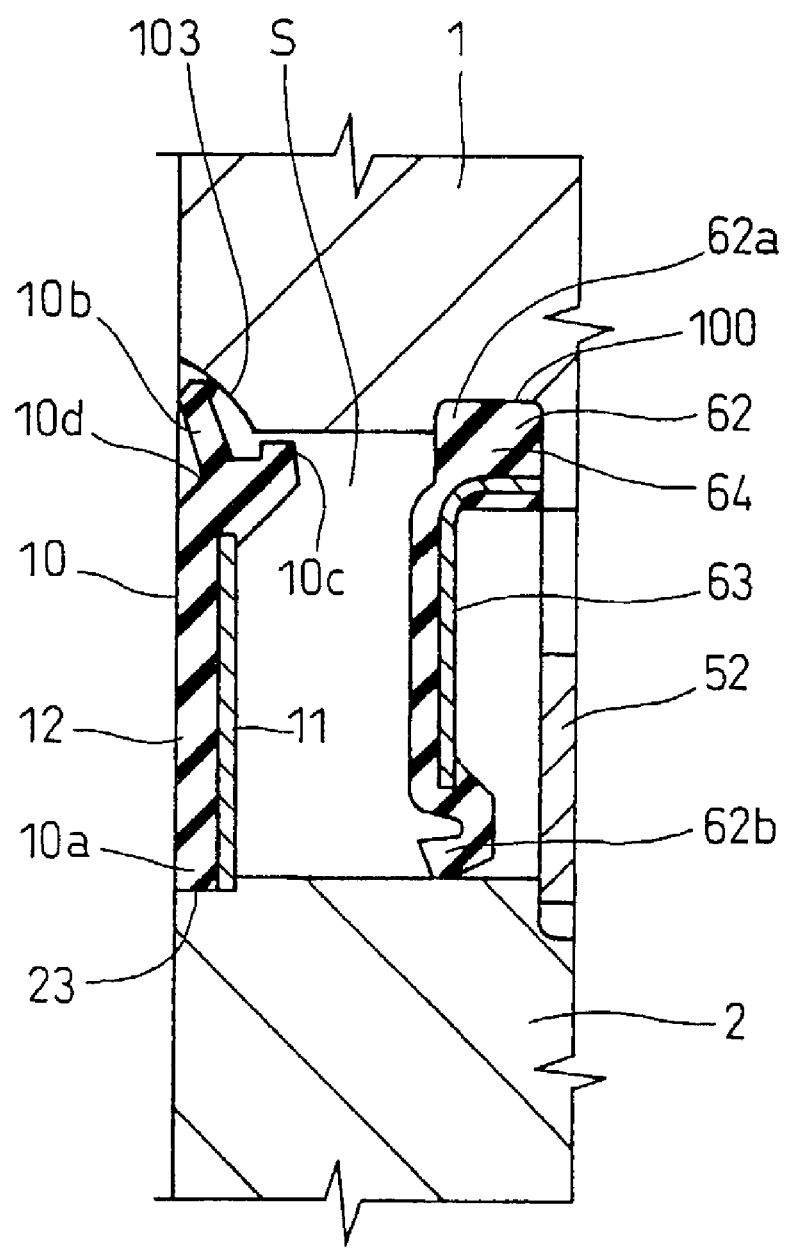
FIG. 8 is an enlarged view of seal portion on the free end side of pulley unit relating to a fifth preferred embodiment of the present invention.

A pulley unit relating to a fifth preferred embodiment of the present invention will be described with reference to FIG. 8. The whole structure of the pulley unit A of the fifth embodiment is the same as that of FIGS. 1 and 2. In accordance with the fifth embodiment, an outer annular seal 10 is provided outside the inner annular seal 62. The outer annular seal 10 is configured such that an outer periphery of an annular core metal 11 is covered by an elastic body 12 such as a rubber. The outer annular seal 10 has a proximal end portion 10a, an axial lip 10b and an auxiliary lip 10c on the distal end side. A peripheral groove 103 is formed by cutting away in a curved concave shape from the inner peripheral surface of the pulley 1 to the outside surface thereof The proximal end portion 10a of the outer annular seal 10 is fitted into, by pressing, the peripheral groove 23 formed at the outer peripheral surface of the shaft body 2. The axial lip 10b engages with the peripheral groove 103. In this way, the annular space S is sealed. The axial lip 10b elastically slide-contacts the peripheral groove 103, and the auxiliary lip 10c is disposed so as to oppose the inner peripheral surface of the pulley 1 with a small distance therebetween. A groove portion 10d having a triangular cross-section is formed at the outer diameter side outer surface of the outer annular seal 10 by radially extending the tapered surface.

In accordance with such pulley unit A, the same effects as in the first embodiment can be obtained.

Even if the outer annular seal 10 receives a centrifugal force by high speed rotation, the proximal end portion 10a on the inner diameter side is not deformed and the auxiliary lip 10c is deflected toward the outer diameter side. Thus, the axial lip 10b press-contacts the peripheral groove 103 and a sealing effect can be maintained.

The peripheral groove 103 is formed in a curved concave shape at an incline from the inner peripheral surface of the pulley 1 to the outside surface thereof. The groove portion 10d is formed at the outer surface of the outer annular seal 10 by radially extending the tapered surface. Thus, muddy water at the inner and outer surfaces of the outer annular seal 10 is smoothly drained outside by a centrifugal force at a time of high speed rotation through the peripheral groove 103 and the groove portion 10d. The groove portion 10d needs not to be formed so as to have a triangular cross-section. For example, the groove portion 10d may be formed in a radially curved concave shape. The peripheral groove 103 may not be formed in a curved concave shape, and may have a linear inclined surface.

Sixth Preferred Embodiment

Figure 9:
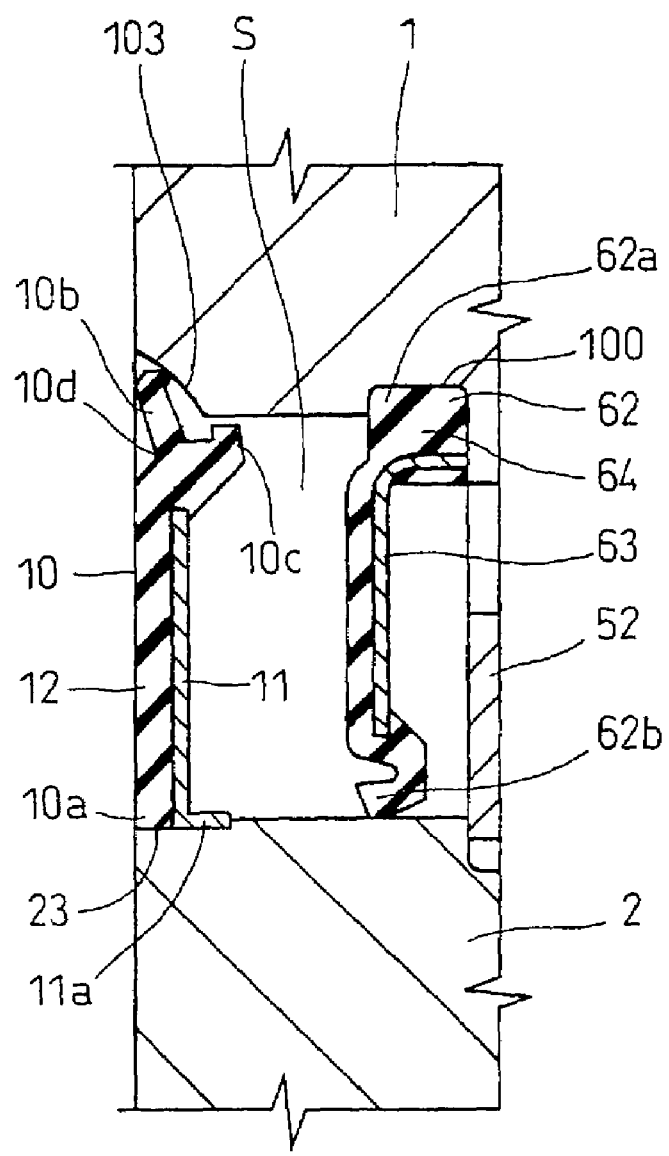
FIG. 9 is an enlarged view of seal portion on the free end side of pulley unit relating to a sixth preferred embodiment of the present invention.
Figure 11:
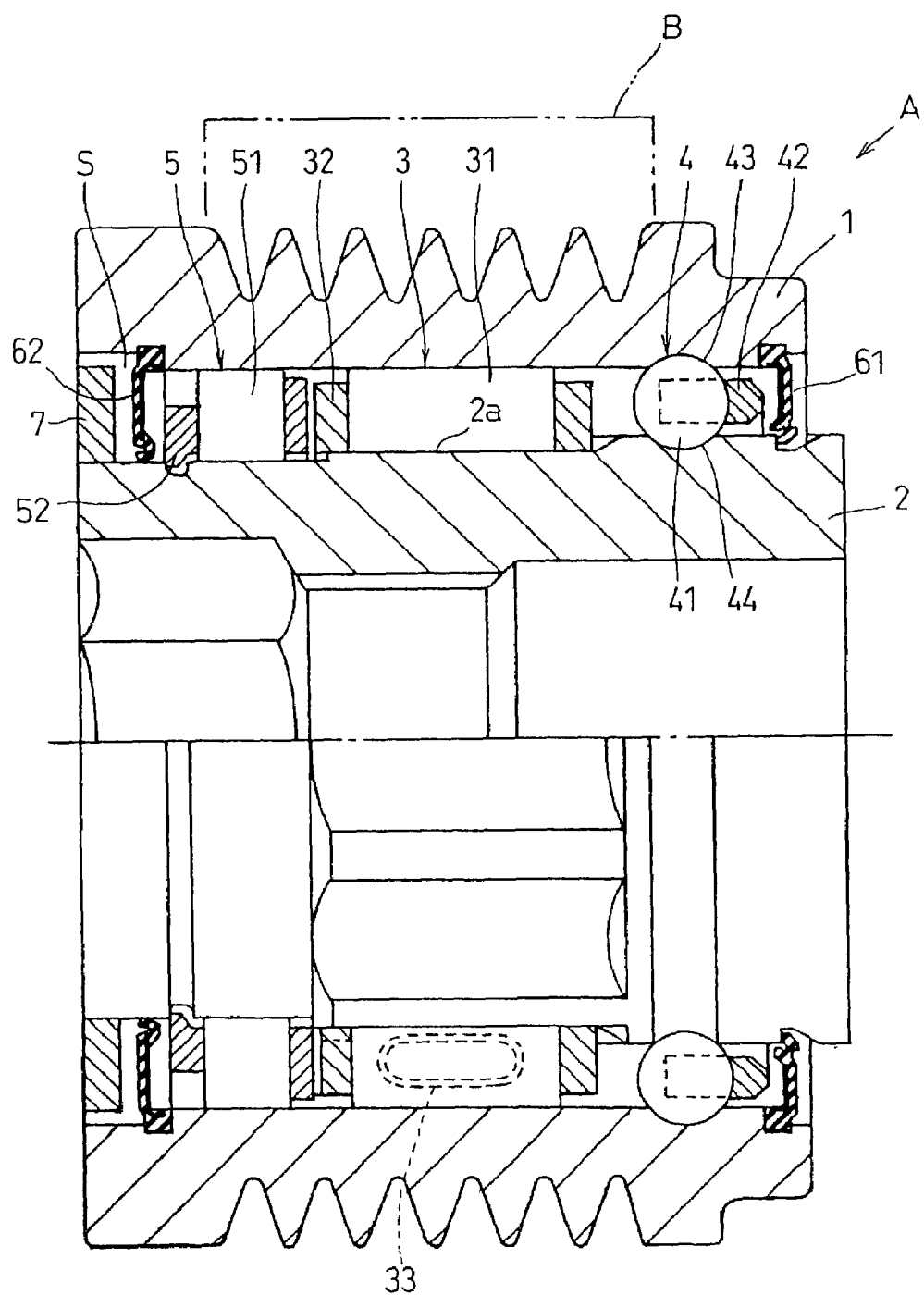
FIG. 11 is a cross-sectional view of conventional pulley unit.

A pulley unit relating to a sixth embodiment of the present invention will be described with reference to FIG. 9. The sixth embodiment relates to a modified example of the outer annular seal 10 of the fifth embodiment. A bent portion 11a is formed at the proximal end portion 10a of the outer annular seal 10 by bending the annular core metal 11 in a bearing internal direction. According to the pulley unit A with such structure, the same effects as in the fifth embodiment can be obtained. As the bent portion 11a is formed at the annular core metal 11, a strength of the outer annular seal 10 is improved and a strength of fixing the outer annular seal 10 to the shaft body 2 is also improved.

Seventh Preferred Embodiment

A pulley unit relating to a seventh preferred embodiment of the present invention will be described with reference to FIG. 10. The seventh embodiment relates to a modified example of the outer annular seal 10 of the fifth embodiment. The bent portion 11a is formed at the annular core metal 11. Further, an extending portion 12a is formed at the proximal end portion 10a by extending the elastic body 12 in an inner diameter direction. An annular concave portion 24 having a reduced diameter in a radially internal direction is formed at the outer end of the peripheral groove 23. According to the pulley unit A, the same effects as in the sixth embodiment can be obtained. By the extending portion 12a, it is possible to prevent muddy water from entering from a space between the proximal end portion 10a of the outer annular seal 10 and the peripheral groove 103.

In the respective embodiments, the deep groove ball bearing 4 is disposed at the accessory side of the one-way clutch 3, and the roller bearing 5 is disposed at the free end side thereof. Nevertheless, the present invention is not limited to the pulley unit A with such structure, and may be applied to various types of pulley units. The free end side may not be sealed by a double contact type seal, and the accessory side may be sealed by a double contact type seal. Alternatively, opposite ends of the annular space S may be sealed by a double contact type seal.

Instead of the outer annular seals 8 and 10 having the axial lips 8b and 10b and the auxiliary lips 8c and 10c, respectively, an outer annular seal that is formed only of the axial lip 8b or 10b and does not have the auxiliary lip 8c or 10b may be used.

Although outer rings and inner rings of the bearings and the one-way clutch are integrally formed with the pulley and the shaft respectively in the pulley units described above, all or part of them can be formed separately. For example, when the outer ring and inner ring the bearing are formed separately, the outer annular seal can be fixed on pulley or shaft and the inner annular seal can be fixed on the outer ring or the inner ring of the bearing, or the outer annular seal and the inner annular seal can be fixed on the pulley or shaft, or the outer annular seal and the inner annular seal can be fixed on the outer ring or the inner ring of the bearing.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A pulley unit comprising:
an pulley and a shaft body disposed concentrically disposed radially inside of said pulley being rotatable relative to said pulley;
a one-way clutch interposed at an annular space between said pulley and said shaft body and a rolling bearing disposed in said annular space axially adjacent to said one-way clutch;
said pulley having an axially extending inner peripheral surface and said shaft body having an axially extending outer peripheral surface, said inner peripheral surface of said pulley being radially exterior to said outer peripheral surface of said shaft body;
a first peripheral surface being one of said inner peripheral surface of said pulley and said outer peripheral surface of said shaft body;
a second peripheral surface being the other of said inner peripheral surface of said pulley and said outer peripheral surface of said shaft body;
said first peripheral surface extending to an axial outer wall of said pulley or said shaft body, said first peripheral surface being proximate to said axial wall;
a peripheral groove extending from said first peripheral surface toward said axial outer wall, said peripheral groove having a semicircular cross sectional shape that radially increases towards said axial outer wall;
an axially inner annular seal provided axially outside said rolling bearing in said annular space and having a proximal end portion and a distal end side radial lip;
the proximal end portion of said inner seal being fixed to said first peripheral surface and said radial lip of said inner seal being elastically bent so as to abut against said second peripheral surface;
an axially outer annular seal provided adjacent to and axially outside said inner annular seal in said annular space so that said outer seal and said inner seal are mutually noncontacting;
said outer seal having a proximal end portion and a distal end side lip, the proximal end portion of said outer seal being fixed to said second peripheral surface;
the distal end side lip of said outer annular seal having an axial lip and an auxiliary lip;
said axial lip of said outer seal engaging said semicircular shape of said peripheral groove; and
said auxiliary lip of said outer seal opposing said first peripheral surface and being axially spaced from said peripheral groove, wherein a small distance is provided between said auxiliary lip of said outer seal and said inner peripheral surface so as to form a labyrinth seal.

2. The pulley unit according to claim 1, wherein said outer annular seal includes an annular core metal and an elastic body covering an outer periphery of said annular core metal, and a radially inner end of said annular core metal is bent inside along said second peripheral surface.

3. The pulley unit according to claim 1, wherein said outer annular seal includes an annular core metal and an elastic body covering an outer periphery of said annular core metal, an annular concave portion fanned by reducing a diameter of outer end of said second peripheral surface in a radially internal direction is provided, and a radially inner end of said elastic body of said outer annular seal is fitted into said annular concave portion.

4. The pulley unit of claim 1 wherein:
a tapered groove is formed on an axially outer surface of said outer seal so as to form a triangular cross section on a radially outer portion of said outer seal; and
said axial outer surface of said outer seal being radially planar between a radial bottom surface and said tapered groove.

* * * * *